United States Patent [19]

Kim et al.

[11] Patent Number: 5,288,804
[45] Date of Patent: Feb. 22, 1994

[54] ACETOACETATE AROMATIC ALDIMINE RESIN COMPOSITION

[75] Inventors: Kyu-Jun Kim, Tonawanda; Roy C. Williams, Orchard Park, both of N.Y.

[73] Assignee: Reichhold Chemicals, Inc., Durham, N.C.

[21] Appl. No.: 817,473

[22] Filed: Jan. 3, 1992

[51] Int. Cl.$^5$ .............................................. C08L 61/00
[52] U.S. Cl. ................................... 525/154; 525/157; 525/165; 525/437; 525/441; 525/447; 525/451; 525/472; 528/230; 528/266; 528/269; 528/272; 528/296; 528/303; 528/392; 526/75; 526/203
[58] Field of Search ............... 528/230, 266, 269, 272, 528/296, 303, 392; 525/154, 157, 165, 437, 441, 447, 451, 472; 526/75, 203

[56] References Cited

U.S. PATENT DOCUMENTS

| | | | |
|---|---|---|---|
| 3,668,183 | 6/1972 | Hoy et al. | 260/65 |
| 4,772,680 | 9/1988 | Noomen et al. | 528/229 |

FOREIGN PATENT DOCUMENTS 0199087 10/1985 European Pat. Off.
0240083 10/1987 European Pat. Off.

*Primary Examiner*—John Kight, III
*Assistant Examiner*—Sam A. Acquah
*Attorney, Agent, or Firm*—Michael L. Dunn

[57] ABSTRACT

A composition comprising a first component including a compound comprising at least two acetoacetate groups, and a second component including a compound comprising at least two groups which will react with an acetoacetate group, at least one of which is an aromatic aldimine group having a relatively low reactivity with water when compared with its reactivity with an acetoacetate group.

The components may be premixed in water prior to application.

The invention further includes a product comprising a cured blend of the two components. The product of the invention is usually a coating or film.

35 Claims, No Drawings

ACETOACETATE AROMATIC ALDIMINE RESIN COMPOSITION

BACKGROUND OF THE INVENTION

The present invention relates to curable polyacetoacetate resins and more particularly relates to such resins which require relatively low solvent loading.

U.S. Pat. No. 3,668,183 describes a polyenamine resin produced from the reaction between polyacetoacetates or polyacetoamides with blocked polyamines. The patent generically discloses at least 30 possible diamines to be blocked and 26 carboxyl compounds to be used for blocking. This yields 780 possible combinations if blends are not used. If blends are used, over 20,000 combinations are possible. In general, the polyamine is blocked with an aliphatic ketone or aldehyde to form ketimines or aldimines. All specific examples utilize aliphatic ketones as blocking agents. The only ketone aromatic compound even suggested for blocking within a long list of possible blocking agents, is the aromatic ketone methyl phenyl ketone. The only aromatic aldehyde suggested for blocking is benzaldehyde and no advantage is suggested for its selection from among the long list of other possibilities.

According to U.S. Pat. No. 3,668,183, the reaction proceeds by water hydrolysis of the ketimine or aldimine to regenerate the amine which then reacts with the polyacetoamide and polyacetoacetate. The reaction and product of U.S. Pat. No. 3,668,183 has significant disadvantages. In particular, coatings or films can be formed only in relatively thin layers due to the requirement of atmospheric moisture penetration in order to cure the coating or film. Furthermore, the system is exceedingly moisture intolerant and the ketimine or aldimine compound must be carefully protected from moisture. In addition, because the system requires moisture penetration, uniform curing throughout a coating is difficult, thus gloss and solvent resistance is often not as high as desired. Also, since the system is dependent upon external moisture, which is a variable, cure times and cure properties are not consistent.

U.S. Pat. No. 4,772,680 and European Patent Application 0199087 similarly describe a reaction between acetoacetate and aliphatic amines blocked with aliphatic or cycloaliphatic ketones. These systems again rely upon hydrolysis to catalyze the reaction and are thus subject to all the disadvantages previously described with respect to U.S. Pat. No. 3,668,183.

It is known that aromatic aldehydes are so reactive to primary amines that imines form at room temperature, even without removal of water of reaction. This indicates that aromatic aldimines are relatively stable to hydrolysis, and are thus not suitable for a water catalyzed reaction such as described in the forgoing references, despite the suggestion of U.S. Pat. No. 3,668,183 to the contrary.

BRIEF DESCRIPTION OF THE INVENTION

It has now been surprisingly found that aromatic aldimines not only can in fact be reacted with polyacetoacetates, but that the previously described disadvantages of the reactions with aliphatic ketimines and aldimines can be avoided.

The reaction does not proceed primarily by hydrolysis of the aromatic aldimine as suggested by U.S. Pat. No. 3,668,183, previously discussed, but surprisingly proceeds by an entirely different mechanism.

In particular, according to the present invention, there is provided an ambient temperature curable coating composition comprising a first component including a compound comprising at least two acetoacetate groups, and a second component including a compound comprising at least two groups which will react with an acetoacetate group, at least one of which is an aromatic aldimine group having a relatively low reactivity with water when compared with its reactivity with an acetoacetate group.

The components may be premixed in water prior to application.

The invention further includes a product comprising a cured blend of the two components. The product of the invention is usually a coating or film.

DETAILED DESCRIPTON OF THE INVENTION

"Two component" as used herein means that the components are provided in an unmixed or unblended state prior to reaction to form the product of the invention and that such components react to form such a product when they are blended together at ambient temperature.

"Ambient temperature" means a temperature most usually encountered in temperate climates, i.e., between about 0° and 40° C. Some of the compositions of the invention may cure at temperatures as low as 0° C. or lower but most such compositions will cure at between 10° and 30° C. and all such compositions will cure at 40° C. or lower. It is to be understood that even though the compositions of the invention will cure below 40° C., higher curing temperatures may be used if desired.

"Elevated temperature" means a temperature above 40° C.

The compound comprising at least two acetoacetate groups in the first component are usually acetoacetate functional addition polymers, condensation polymers or mixtures thereof.

The addition polymers useful for the invention are frequently acrylic containing polymers which may contain up to 80 percent by weight of an acetoacetate ester of a hydroxyacrylate or of an allyl alcohol monomer residue. A preferred addition polymer comprises an acetoacetoxy ethylmethacrylate group containing polymer.

The acetoacetate group containing addition polymer is usually the reaction product of up to 70% by weight of functional group containing monomer, with the balance being olefinically unsaturated or vinyl containing monomers.

The functional group containing monomer for the addition polymer may be epoxy containing monomer, acid anhydride containing monomer, hydroxy containing monomer, carboxy containing monomer, a mixture of epoxy containing monomer and hydroxy containing monomer, a mixture of acid anhydride containing monomer and carboxy containing monomer, and a mixture of carboxy containing monomer and hydroxy containing monomer.

Epoxy containing monomers to be used for the present invention include glycidyl acrylate, glycidyl methacrylate, n-glycidyl acrylamide, allyl glycidyl ether and the like.

Acid anhydride containing monomers include itaconic anhydride, maleic anhydride, citraconic anhydride, methacrylic anhydride and the like.

Hydroxy containing monomers include hydroxy alkyl (meth) acrylate, hydroxy alkyl methacrylate, or allyl alcohol, for example, hydroxy ethylacrylate hydroxyethylmethacrylate, hydroxy propylacrylate, hydroxy propyl methacrylate and the like.

Carboxy containing monomers include acrylic acid, methacrylic acid, crotonic acid, itaconic acid, fumaric acid, maleic acid, citraconic acid and the like.

Examples of appropriate olefinically unsaturated monomers for the present invention are acrylate and methacrylate such as methyl methacrylate, methylacrylate, isobutyl methacrylate, n-butyl methylacrylate, propylacrylate, 2-ethyl hexyl acrylate and the like.

Monovinyl hydrocarbons suitable for use include styrene, 2-methyl styrene, vinyl toluene, t-butyl styrene, chlorostyrene and the like.

The acetoacetate groups containing addition polymer usually has a weight average molecular weight of about 2,000–80,000 determined by gel permeation chromatography, and preferably, has a weight average molecular weight of 3,000–40,000. The acetoacetate groups containing addition polymer usually has a glass transition temperature of from $-10°$ C. to $100°$ C. and preferably $0°$ C. to $50°$ C.

The acetoacetate group containing condensation polymer useful for the invention include polyurethane, polyepoxide, polyester and alkyd polymers. The acetoacetate group containing condensation polymers may be obtained by the reaction of polymers having at least two hydroxy groups per molecule with either alkylacetoacetate or diketene. Hydroxy group containing polymers in accordance with the present invention may be terminal and/or pendant to the polymer main chain.

Useful hydroxy group containing polyurethanes for the preparation of the acetoacetate containing condensation polymers may be formed by reaction of polyisocyanate with an excess amount of polyhydric compound.

Examples of suitable polyisocyanates are aromatic, aliphatic, cycloaliphatic isocyanates and mixtures thereof such as tolylene diisocyanates, m-pheylene diisocyanate, tetramethyl xylyldiisocyanate, xylyldiisocyanate, hexamethylene diisocyanate and its dimer, methylene-bis (4-phenyl isocyanate), naphthalene 1,5-diisocyanate, methylene-bis (4-cyclohexylisocyanate) and the like.

Polyhydric compounds which may be useful to prepare hydroxy groups containing polyurethanes in accordance with the present invention may be difunctional, trifunctional, tetrafunctional, or mixture thereof.

Difunctional hydroxy compounds may be high molecular weight compounds with molecular weights from 400 to 6000 and/or short chain compounds. Examples of suitable high molecular weight diols are hydroxy terminated polyesters, polyethers, polylactones, polycarbonates, polythioethers, and mixture thereof.

Examples of short chain diols are 1,2-ethylene glycol, 1,4-butanediol, 1,4-cyclohexyldimethanol, neopentyl glycol, 2-methyl-1,3 propanediol, 1,6-hexanediol and the like. Examples of polyhydroxy compounds having a functionality of three or more are glycerol, trimethylol propane and pentaerythritol.

Optionally, carboxy functionality may be included in hydroxy group containing polyurethanes by using dimethanol propionic acid in the preparation in order to improve the curing rate. Hydroxy groups containing polyurethanes may be fully or partially acetoacetylated as may any of the other acetoacetylated composition described herein. Such partially acetoacetylated compositions may contain hydroxy functionality.

Useful hydroxy group containing epoxies may be obtained by the reaction of polyepoxides with either polyhydroxy or polycarboxy compounds or mixtures thereof. Monofunctional compounds may be used to control the molecular weight and the terminal functionality.

Examples of polyepoxide compounds include aliphatic and aromatic polyepoxides such as 3,4-epoxycyclohexyl methyl 3,4-epoxy cyclohexane carboxylate, diepoxide bis (3,4-epoxy-6-methyl cyclohexyl methyl) adipate, sorbitol polyglycidyl ether, pentaerythritol polyglycidyl ether, triglycidyl tris (2-hydroxyethyl) isocyanurate, diglycidyl ethers of bisphenol A, diglycidyl ethers of bisphenol F, 4 glycidyl oxy-N,N-diglycidyl aniline, and the like.

Examples of polyhydric aromatic compounds useful for reaction with the polyepoxide compounds are bisphenol A, 1,1-bis (4-hydroxy phenyl) ethane, 2-methyl-1,1-bis (4-hydroxy phenyl) propane and the like, Examples of polyhydric aliphatic compounds include those appeared previously in the description of polyhydric compounds useful for preparing the hydroxy groups containing polyurethanes.

Examples of polycarboxy compounds include succinic acid, adipic acid, azelaic acid, sebacic acid, isophthalic acid, terephthalic acid, maleic acid and the like. Acetoacetate group containing epoxides may have terminal hydroxy, epoxy, or carboxy functional groups depending on the reagents and the molar ratios used for their preparation.

Hydroxy group containing polyesters useful for the present invention may be produced with polycarboxy compounds or their anhydrides and polyhydroxy compounds. Examples of polycarboxylic compounds and their anhydrides suitable for preparation of the polyester polyols include succinic acid, adipic acid, azaleic acid, sebacic acid, isophthalic acid, terephthalic acid, maleic acid, maleic anhydride, succinic anhydride, phthalic anhydride, hexahydrophthalic anhydride, tetrahydrophthalic anhydride, trimellitic anhydride, and the like. Useful polyhydric compounds have functionalities of two or more and their examples are those previously given with respect to polyhydric compounds useful for preparing hydroxy group containing polyurethanes and polyepoxides. Hydroxy group containing polyesters may contain terminal hydroxy or carboxy functionalities depending on the molar ratios of reagents.

Hydroxy group containing alkyds are typically prepared by reacting polyhydric compounds with polycarboxylic compounds or their anhydrides, and fatty acids derived from drying, semi-drying, or non-drying oils in various proportions. Monobasic acids may also be incorporated to control the molecular weight. Examples of polyhydric compounds useful for preparing alkyd polyols in the present invention include short chain diols, triols and tetraols, such as 1,2-ethylene glycol, 1,4-butane diol, 1,4-cyclohexyl dimethanol, neopentyl glycol, 2-methyl-1,3-propanediol, 1,6-hexanediol, glycerol, trimethylol propane, pentaerythritol and the like.

Examples of polycarboxylic compounds and their anhydrides are the same as those previously described with respect to polycarboxylic acids and their anhydrides useful for preparing hydroxy group containing polyesters. Examples of suitable acids include saturated and unsaturated acids such as eleostearic acid, linoleic acid, lindeic acid, octadecadienoic acid, linolenic acid, oleic acid, palmitoleic acid, myristic acid, stearic acid, ricinoleic acid and the like.

Acetoacetate group containing addition polymers and condensation polymers may contain organic solvents of 0.01 to 5 parts by weight per part of the polymer in order to have a sufficiently low viscosity for coating application. The solvents useful for the invention are comprised of carbon and hydrogen with or without other elements such as oxygen and nitrogen.

Acetoacetate group containing addition and condensation polymers may be blended with epoxy group containing compounds, acid anhydride group containing compounds, both epoxy and acid anhydride group containing compounds, and mixtures thereof. Useful epoxy containing compounds for blending with acetoacetate groups containing polymers include epoxy group containing acrylic polymers, glycidyl ethers of polyols, cyclohexaneoxide containing polyepoxide, polymeric epoxides and epoxidized olefins.

Epoxy group containing acrylic polymers useful for blending with acetoacetate polymers may be the reaction product of up to 80% by weight of epoxy containing monomer with the balance of olefinically unsaturated monomers, monovinyl hydrocarbons and mixtures thereof. Examples of useful monomers are the same as those described in the preparation of acetoacetate acrylic polymers.

Glycidyl ethers of polyols useful for blending may be saturated, unsaturated, aliphatic, cycloaliphatic, aromatic, heterocyclic, and may be substituted with halogen or hydroxy groups. Examples of the glycidyl ethers of polyol include glycidyl ethers of ethylene glycol, glycerol, erythritol, sorbitol, resorcinol, catechol, bis (4-hydroxy phenyl) methane, novolac resins, p-amino phenol, hydroxybiphenyl and the like.

Cyclohexaneoxide containing polyepoxides useful for the present invention include bis (3,4-epoxy cyclohexyl methyl) oxalate, 3,4-epoxycyclohexyl methyl 3,4-epoxy cyclohexane carboxylate, bis(3,4-epoxy cyclohexyl methyl) adipate, 2-(3,4-epoxy cyclo hexyl-5,5-spiro-3,4-epoxy) cyclohexane-meta-dioxane and the like.

Polymeric epoxides useful for blending with acetoacetate polymers may be prepared by reacting polyepoxide with polyhydroxy or polycarboxy compounds or mixtures thereof with a stoichiometric excess amount of epoxy functionality. Useful polyepoxides, polyhydroxy compounds and polycarboxy compounds to prepare polymeric polyepoxides are the same as those described with respect to preparing acetoacetate group containing polyepoxides.

Acid anhydride group containing compounds useful for blending with acetoacetate groups containing polymers for the present invention include monomeric acid anhydrides, anhydride adducts, and acid anhydride groups containing acrylic polymers.

Monomeric acid anhydrides useful for blending include aliphatic, cycloaliphatic, olefinic, and aromatic anhydrides such as succinic anhydride, methyl succinic anhydride, dodecenyl succinic anhydride, octadecenyl succinic anhydride, phthalic anhydride, tetraphydrophthalic anhydride, methyl tetrahydrophthalic anhydride, hexahydrophthalic anhydride, alkyl hexahydrophthalic anhydride, nadic methyl anhydride and the like.

Useful anhydride adducts for blending include anhydride adducts of a diene polymer such as maleinized polybutadienes and maleinized copolymers of butadiene. Anhydride adducts of unsaturated fatty acid esters may also be used for the blending with acetoacetate groups containing polymers.

Epoxy and acid anhydride group containing compounds which may be blended are mainly acrylic polymers prepared with up to 70% by weight of epoxy containing unsaturated monomer(s) and up to 70% by weight of anhydride containing unsaturated monomer(s), and optionally up to 70% by weight of acetoacetate containing unsaturated monomer, the balance being inert monoethylenically unsaturated monomers.

The second component for the novel curing system is moisture insensitive monomeric, oligomeric or polymeric aromatic aldimine having the following formula:

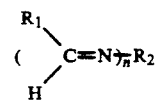

Wherein:
$R_1$ is aryl group with or without alkyl, halogen, or hydroxy substitution.
$R_2$ is a group selected from hydrocarbon, polyalkyl ether, an oligomeric adduct or acrylic polymer which may contain at least one group such as secondary amine, which will react with an acetoacetate group.
n is greater than two. However, when $R_2$ contains an acetoacetate reactive group such as secondary amine, n may be one.

An aromatic aldimine may be produced by the reaction of equivalent amounts of primary amine and aromatic aldehyde while removing the water formed as follows:

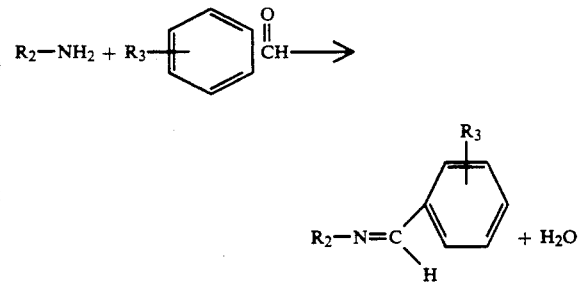

Where, $R_3$ is hydrogen, alkyl, hydroxy or halogen.

Examples of appropriate aromatic aldehydes for the preparation of aromatic aldimines include benzaldehyde, 4-chlorobenzaldehyde, 4-ethylbenzaldehyde, 4-isobutylbenzaldehyde, salicylaldehyde, and the like.

Monomeric aromatic aldimines may be obtained by reacting aromatic aldehydes with short chain aliphatic primary amines of $C_2$-$C_{10}$ such as ethylenediamine, hexamethylenediamine, diethylene triamine, triethylene tetramine, 3-amino-1-cyclohexyl amine propane, N-methyl amino propyl amine, 2-(2-amino ethyl amino) ethanol and the like.

Oligomeric aromatic aldimines may be produced from polyoxyalkyl polyamines such as ethyl, tri (α aminopolyoxypropylene methylene) methane, having the structural formula:

1.

where a, b and c are independently at each occurrence integers of 2 to 12; or such as β aminopropyl, α aminopolyoxypropylene, methane, having the structural formula:

2.

where a is from 2 to 12.

Compounds of formula 1, above, where a, b and c are between 1.5 and 3 and a+b+c is usually about 5.3, are available from Texaco Chemicals under the trademark Jeffamine T403 ® and compounds of formula 2, above, where a is from 2 to 3 and usually about 2.6 are available from Texaco Chemicals under the trademark Jeffamine D230 ®. In addition, aromatic aldimines may also be obtained from adducts between aromatic aldimine containing secondary amines and secondary amine reactive groups containing compounds. Aromatic aldimine containing secondary amines useful for the present invention may be prepared by the reaction between aromatic aldehydes and primary amines having one or more secondary amine groups such as diethylene triamine, triethylene tetramine, 3-amino-1-cyclohexyl amine propane, N-methyl amino propyl amine, 2-(2-amino ethyl amino) ethanol and the like.

Secondary amine reactive groups containing compounds include polyisocyanates, polyepoxides, poly(meth)acryloyls and polycarboxylic acids. Examples of polyisocyanates and polyepoxides are the same as those mentioned earlier in the description for preparing polyurethane polyols and polyepoxide polyols. Examples of useful poly(meth)acryloyl compounds which may be reacted with a secondary compound to form a tertiary amine linkage include diethylene glycol di(meth)acrylate, 1,4-butanediol di(meth)acrylate, 1,3-butylene glycol di(meth)-acrylate, polyethylene glycol di(meth)acrylate, tetraethylene glycol di(meth)acrylate 1,6-hexanediol di(meth)acrylate, tris (2-hydroxy ethyl) isocyanurate tri(meth)acrylate, pentaerythritol tetra(meth)acrylate, trimethylol propane tri(meth)acrylate and the like.

Examples of polycarboxylic acids useful for the present invention may include carboxylic groups terminated polyesters which are obtained by reacting excess amount of multi-functional carboxylic compounds with polyhydroxy compounds.

Polymeric aromatic aldimines may be obtained by reacting aromatic aldimine containing secondary amines with secondary amine reactive groups containing polymers. Useful aromatic aldimine containing secondary amines are benzaldehyde reacted diethylene triamine, 3-amino-1-cyclohexyl amine propane, N-methyl amino propyl amine, 2-(2-amino ethyl amino) ethanol and the like. Secondary amine reactive groups containing polymers are mainly acrylics which are prepared with 5–50 percent by weight of glycidyl esters of monoethylenically unsaturated carboxylic acid or isocyanate containing mono-ethylenically unsaturated monomers, for example, dimethyl-m-isopropenyl benzyl isocyanate. The remainder of the monomers for secondary amine reactive groups containing acrylic polymers are (meth) acrylates and monovinyl carbons described before. However, care should be taken not to lead to phase-separation when mixed with acetoacetate groups containing compounds.

Optionally, the second component for the present invention may contain multifunctional secondary amines in conjunction with aromatic aldimines. Multifunctional secondary amines may be monomeric or oligomeric.

Examples of useful monomeric multifunctional secondary amines include N,N'-dimethyl-1,6-hexanediamine, N-ethyl N'-methyl ethylene tiamine, piperazine and the like.

Multifunctional secondary amines may be obtained by the reaction between (meth)acryloyls and primary amines according to the following scheme.

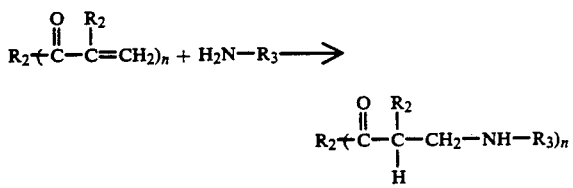

Wherein:

n is greater than one
$R_1$ is methyl or hydrogen
$R_2$, $R_3$ are hydrocarbons with or without oxygen.

Useful poly(meth)acryloyl compounds are those mentioned earlier in the description of preparing oligomeric aromatic aldimines. Examples of useful primary amines include 3-amino propanol, n-butyl amine, sec-butyl amine, cyclohexyl amine, cyclopentyl amine, 2-diethyl amino ethyl amine, 3-diethyl amino propyl amine, 2-ethyl hexyl amine, isobutyl amine, isopropylamine, 2-methoxy ethylamine, 3-methoxypropylamine, n-octyl amine, n-propyl amine, and the like.

The mixing ratios of the two components in the present invention may be selected to provide the equivalent ratios of acetoacetate to aromatic aldimine in a range from 1:5 to 5:1. A coating composition for the invention may be applied to a substrate by any conventional methods such as brushing, dipping, flowing and spraying. A coating composition of the invention can be cured by heating at elevated temperature or without heating at ambient temperature, typically at room temperature without an added catalyst. Therefore, coating compositions of the present invention are particularly suitable for automotive refinish although they have utility in general coating applications, which require good appearance and excellent solvent resistance.

The components may be preblended in water to form a dispersion of reacted particles which may be applied to form a film by coalescence or in the case of components which are relatively non-reactive to form a film in situ by elevated temperature curing.

A coating composition of the present invention may contain pigments and various ingredients generally known for a coating industry such as fillers, antioxidants, UV stabilizers, etc.

It is to be understood that when a component of the invention is generically described, mixtures of species of the generic component may be used.

The following examples illustrate the invention and should not be construed as a limitation on the scope thereof.

EXAMPLES

Preparation of polyacetoacetate

Example 1 Preparation of an Acrylic Polyacetoacetate

|   | Component | grams |
|---|---|---|
| A) | ethyl 3-ethoxy proprionate (EEP) | 675 |
| B) | methylmethacrylate | 188 |
|   | acetoacetoxy ethylmethacrylate | 225 |
|   | isobutylmethacrylate | 150 |
|   | isooctylthioglycolate | 10 |
|   | azobisisobutyronitrile (ABN) | 7 |
| C) | ABN | 1 |
|   | EEP | 75 |

Component A was charged into a four neck reaction flask equipped with an addition funnel, metal stirrer, thermometer, cold water condenser and nitrogen inlet. The reactor was heated to 135° C. under a nitrogen stream, then Component B was added dropwise to a reactor through the addition funnel over a period of 2 hours. At 30 minutes, after the addition of Component B is complete, Component C was added dropwise over a period of 1 hour. The reaction was continued at 135° for 2.5 hours, then stopped by cooling to room temperature. The resulting resin had a nonvolatile content (NV) of 47.2 and a Brookfield viscosity of 164 centipoise.

Example 2 Preparation of an Acrylic Polyacetoacetate Containing Epoxy and Anhydride Functional Groups

|   | Component | grams |
|---|---|---|
| A) | EEP | 600 |
| B) | acetoacetoxy ethylmethacrylate | 117 |
|   | glycidyl methacrylate | 35 |
|   | maleic anhydride | 21 |
|   | styrene | 138 |
|   | n-butyl acrylate | 138 |
|   | isobutyl methacrylate | 242 |
|   | isoctyl thioglycolate | 10 |
|   | ABN | 11 |
| C) | ABN | 2 |
|   | EEP | 75 |

Maleic anhydride, styrene, n-butyl acrylate and isobutyl methacrylate were mixed in a beaker and heated while stirring. When maleic anhydride were completely solubilized, the monomer mixture was cooled to room temperature, then the remainder of component B was added to a monomer mixture. Component A was charged into a four neck reaction flask equipped as described in Example 1. The reactor was heated to 120° C. under a nitrogen stream, then Component B was introduced into a reactor through the addition funnel over about 2 hours. The reaction temperature was maintained at 120° C. for 50 minutes before Component C was added through the addition funnel over approximately 25 minutes. Polymerization was continued at 120° C. for another 2 hours. The resulting resin had an NV of 49.4 and a Brookfield viscosity of 250 cps.

Example 3 Preparation of an Acrylic Polyacetoacetate Containing Epoxy and Anhydride Functional Groups

|   | Component | grams |
|---|---|---|
| A) | propylene glycol methyl ether acetate (PGMEA) | 600 |
| B) | acetoacetoxy ethyl methacrylate | 69 |
|   | maleic anhydride | 28 |
|   | glycidyl methacrylate | 55 |
|   | styrene | 242 |
|   | n-butyl acrylate | 297 |
|   | isooctylthioglycolate | 5 |
|   | ABN | 10 |

Maleic anhydride, styrene, and n-butyl acrylate were mixed in a beaker and heated while stirring. When maleic anhydride was completely solubilized, the monomer mixture was cooled to room temperature, then the remainder of Composition B was added. Component A was charged into a four neck reaction flask equipped as in Example 1. The reactor was heated to 120° C. under nitrogen stream and Component B was added to the reactor through the addition funnel over 2 hours. The reaction temperature was maintained at 120° C. for another 11 hours before polymerization was stopped by cooling to room temperature. The resulting resin had an NV of 50.8, a Brookfield viscosity of 588 cps, and a Gardner color of 1+.

Example 4 Preparation of Acrylic Polyacetoacetate Containing Epoxy and Anhydride Functional Groups

|   | Component | grams |
|---|---|---|
| A) | PGMEA | 600 |
| B) | acetoacetoxy ethyl methacrylate | 90 |
|   | maleic anhydride | 14 |
|   | glycidyl methacrylate | 69 |
|   | methyl methacrylate | 290 |
|   | n-butyl acrylate | 138 |
|   | isobutyl methacrylate | 90 |
|   | isooctylthioglycolate | 10 |
|   | ABN | 10 |

The procedure is the same as Example 3 except polymerization was carried out at 120° C. for 12 hours after addition of Component B to the reactor was complete. The resulting resin had an NV of 50.3, Brookfield viscosity of 855 cps, and Gardner color of 4+.

Example 5 Preparation of an Aacrylic Polyacetoacetate Containing Epoxy and Anhydride Functional Groups

|   | Component | grams |
|---|---|---|
| A) | xylene | 600 |
| B) | acetoacetoxy ethyl methacrylate | 104 |
|   | maleic anhydride | 35 |
|   | glycidyl methacrylate | 75 |
|   | styrene | 138 |
|   | isobutyl methacrylate | 173 |
|   | n-butyl acrylate | 173 |
|   | isooctyl thioglycolate | 10 |
|   | ABN | 15 |

The procedure is the same as Example 3 except polymerization was carried out at 120° C. for 6 hours after addition of Component B was complete. The resulting resin has NV of 52, Brookfield viscosity of 138 cps and Gardner color of 3.

Example 6 Preparation of an Epoxy Acetoacetate

|   | Component | grams |
|---|---|---|
| A) | Bisphenol epichlorohydrin based epoxy resin | 595 |
|   | Bisphenol A | 205 |

| Component | grams |
| --- | --- |
| B) EEP | 400 |
| C) t-butyl acetoacetate | 218 |

In a four neck reaction flask, equipped with thermome nitrogen inlet, metal stirrer, distillate receiver, and cold water condenser, Component A was heated to 140° C. under a nitrogen stream. Heating was continued for 2 hours, then the reaction mixture was diluted with Component B. When the temperature reached 140° C. again, Composition C was added to a reactor through addition funnel over 15 minutes. The reaction was continued for 1.5 hours while collecting t-butyl alcohol. The resulting resin had an NV of 69.6 and a Brookfield viscosity of 7100 cps.

Example 7 Preparation of a Urethane Polyacetoacetate

| Component | grams |
| --- | --- |
| A) trimethylol propane | 53 |
| polypropylene glycol (MW 1025) | 106 |
| dimethylol propionic acid | 16 |
| 2-methyl propylene glycol | 53 |
| B) isophorone diisocyanate | 238 |
| dibutyl tin laurate catalyst (BTL) | 0.5 |
| PGMEA | 140 |
| C) t-butyl acetoacetate | 82 |
| D) PGMEA | 260 |

Component A was charged into a four neck reaction flask equipped as in Example 6 and heated to 130° C. under a nitrogen stream. Component B was added to the reactor through an addition funnel over 25 minutes. The reaction was continued at 130° C. for 2 hours after addition of Component B was complete, then Component C was introduced into the reactor through the addition funnel over 40 minutes while collecting forming t-butyl alcohol. Transesterification was continued for 1 hour and Component D was added. The resulting resin had an NV of 58.4 and a Brookfield viscosity of 336 poise.

Example 8 Preparation of an Ester Polyacetoacetate

| Component | grams |
| --- | --- |
| A) 2-methyl propylene glycol | 195 |
| isophthalic acid | 315 |
| adipic acid | 29 |
| trimethylol propane | 45 |
| B) t-butyl acetoacetate | 174 |
| EEP | 100 |
| EEP | 200 |

Component A was charged into a four neck reaction flask equipped with metal stirrer, thermometer, glass bead packed Vigreux column, distillate receiver, and cold-water condenser. Under nitrogen stream, the reactor was heated to 180° C. and temperature was maintained for 1 hour before being raised to 200° C. The temperature was maintained for about 1 hour, then raised to 230° C. The reaction was continued for 4 hours until AV (acid value) reached below 3.0. The reactor was then cooled to 140° C. Component B was introduced into the reactor through an addition funnel over 1 hour while collecting t-butyl alcohol. The reaction was continued for another 2 hours and Component C was added into the reactor. The resulting resin had an NV of 61.2, Brookfield viscosity of 11.4 poise, and a Gardner color of 1.

Example 9 Preparation of an Alkyd Polyacetoacetate

Step I Alkyd Synethesis

| Component | grams |
| --- | --- |
| A) phthalic anhydride | 1066 |
| benzoic acid | 677 |
| sunflower fatty acid | 222 |
| mono pentaerythritol | 1067 |
| toluene | 80 |
| B) Sunflower fatty acid | 848 |

Component A was charged into a reaction flask, then heated to 215°–221° C. under a nitrogen stream. The reaction was continued for about 3 hours while collecting toluene and water, then Component B was added over about 30 minutes. The reaction was continued at 205° C. for about 8 hours until the AV reached below 10, 2500 grams of Step I product was transferred to another reactor for subsequent acetoacetylation.

Step II Acetoacetylation

| Component | grams |
| --- | --- |
| A) the product of Step I | 2500 |
| B) t-butyl acetoacetate | 582 |
| C) methyl propyl ketone | 580 |

Component A was heated to 138°–143° C. under a nitrogen stream and Component B was added into the reactor over about 4 hours while collecting t-butyl alcohol. The reaction was continued at 142°–157° C. for about 2.5 hours until collecting of t-butyl alcohol stops. The reactor was cooled to 110° C., then Component C was added. The resulting resin had an NV of 82.5, a Brookfield viscosity of 141 poise and a Gardner color of 10+.

Example 10 Preparation of Water-Dispersible Acetoacetylated Polyester

| Component | grams |
| --- | --- |
| A) trimethylol propane | 70 |
| tetrahydrophthalic anhydride | 159 |
| B) bisphenol epichlorohydrin based epoxy resin | 99 |
| C) N-methylpyrrolidinone | 20 |
| D) t-butyl acetoacetate | 133 |
| E) butoxy ethanol (butyl Cellosolve ™) | 80 |

Component A was charged into a 1-liter flask equipped with a distillate receiver, cold water condenser, nitrogen inlet, metal agitator, and thermometer. Under a nitrogen stream, the reactor was heated to 130° C. After thirty minutes, Component B was introduced and the reaction was continued at a temperature between 130°–145° C. until the acid value approached about 89. The reaction product was thinned with Component C, then Component D was added to the reactor. The reaction temperature was maintained at 130° C. for about three hours while collecting t-butanol before the reaction was stopped by cooling to 90° C. The reaction product was thinned with Charge E. The resulting resin had an NV of 78.2 and an AV of 97.6. A part of the resin (225 g) was neutralized with triethylamine (18 g) and dispersed in water (371 g). The dispersed resin has an NV of 31.2 and pH value of 7.4.

Example 11 Preparation of Water-Dispersible Acetoacetylated Acrylic Polymer

| Component | | grams |
|---|---|---|
| A) | n-propoxy propanol | 100 |
| B) | acetoacetoxyethyl methacrylate | 175 |
| | styrene | 150 |
| | n-butylacrylate | 125 |
| | acrylic acid | 50 |
| | ABN | 10 |
| | isooctylthioglycolate | 10 |

Component A was charged into a flask equipped with an addition funnel, metal stirrer, thermometer, cold water condenser, and nitrogen inlet. The reactor was heated to 130° C. under a nitrogen stream, then Component B was added through the addition funnel over 2.5 hours. The reaction was continued at 130° C. for another four hours. The resulting resin had an NV of 78.8 and AV of 85.5. A part of the resin (250 g) was neutralized with triethylamine (22 g) and dispersed in water (380 g). The dispersed resin had an NV of 29.1, pH of 8.17, and Brookfield viscosity of 203 poise.

Example 12 Preparation of Water-Dispersible Acetoacetylated Polyurethane

| Component | | grams |
|---|---|---|
| A) | dimethylolpropionic acid | 40 |
| | trimethylolpropane | 68 |
| | polyester glycol | 102 |
| | cyclohexyldimethanol | 5 |
| B) | tetramethylxylyl diisocyanate | 182 |
| | BTL catalyst | 0.5 |
| | methyl isobutyl ketone | 100 |
| C) | t-butyl acetoacetate | 145 |
| D) | N-methyl pyrrolidinone | 60 |
| E) | butoxy ethanol | 90 |

Component B was added through an addition funnel over a period of one hour, to a reactor containing Component A, at 130° C. under nitrogen stream. In ten minutes after the addition of Component B begins, the reaction temperature was lowered to 120° C. The temperature was maintained for about two hours after the addition of Component B was complete and then raised to 130° C. Component C was added into the reactor through the addition funnel over thirty minutes while collecting t-butanol. When the addition of Component C was complete, the reaction product was thinned with Component D.

The reaction temperature was raised to 140° C. and maintained for about one hour until collecting of t-butanol stopped. The reaction was stopped by adding Component E and cooling to room temperature. A part of resin (500 g) was neutralized with triethylamine (23 g) and dispersed in water (750 g). The dispersed resin had an NV of 28.8, pH of 8.10, and a Brookfield viscosity of 183 cps.

Example 13 Preparation of Acetoacetylated Acrylic Emulsion

| Component | | grams |
|---|---|---|
| A) | deionized water | 700 |
| | sulfosuccinate | 20 |

-continued

| Component | | grams |
|---|---|---|
| B) | acetoacetoxylethylmethacrylate | 83 |
| | styrene | 110 |
| | isobutylmethacrylate | 138 |
| | n-butylacrylate | 220 |
| C) | ammonium persulfate | 25 |
| | deionized water | 15 |

Component A was charged into a 2-liter reaction flask and the temperature was raised to 85° C. under nitrogen stream. Ten ml of Component B was added and stirred for five minutes before the rest of Component B was added through an addition funnel over three hours. Polymerization was continued for another three hours. A polymerization product was passed through 25 micron filter bag. The resulting resin had an NV of 40.6 and a Brookfield viscosity of 13 centipoise.

Example 14 Preparation of Water Dispersible Acetoacetylated Polyurethane

| Component | | grams |
|---|---|---|
| A) | polyester glycol | 235 |
| | cyclohexyldimethanol | 78 |
| | dimethylolpropionic acid | 12 |
| | trimethylolpropane | 31 |
| | BTL catalyst | 0.4 |
| | N-methyl pyrrolidinone | 70 |
| B) | dicyclohexyl methane-4,4' diisocyanate (DMDI) | 189 |
| C) | t-butyl acetoacetate | 86 |
| D) | butoxyethanol | 20 |
| E) | triethylamine | 12 |
| F) | water | 700 |

Component A was charged into a 3-liter reaction flask and the temperature was raised to 120° C. under nitrogen stream. Component B was added through an addition funnel over about one hour. After stirring for one hour, Component C was added and the temperature was increased to 130° C. The reaction was continued for two hours while collecting t-butanol. The reactor was cooled to 80° C. and components D and E were introduced. When mixing was complete, the resin was dispersed with Component F. The resulting resin had an NV of 40.8 and a Brookfield viscosity of 53 centipoise.

Example 15 Preparation of Water Dispersible Acetoacetylated Polyurethane

| Component | | grams |
|---|---|---|
| A) | polyester glycol | 352 |
| | cyclohexyldimethanol | 70 |
| | trimethylolpropane | 31 |
| | dimethylolpropionic acid | 12 |
| | BTL catalyst | 0.3 |
| | N-methyl pyrrolidinone | 50 |
| B) | isophorone diisocyanate | 172 |
| C) | t-butyl acetoacetate | 86 |
| D) | butoxy ethanol | 30 |
| E) | triethylamine | 12 |
| F) | water | 700 |

A reactor containing Component A was heated to 130° C. under a nitrogen stream. Component B was added through an addition funnel over one hour. The Temperature was maintained at 130° C. for one hour, then Component C was added. The reaction was continued until collecting of t-butanol stopped. The reaction temperature was lowered to 80° C. and Components D and E were introduced. When mixing was complete, the resin was dispersed with Component F. The dispersible resin had an NV of 443, a pH of 8.9, and a Brookfield viscosity of 915 centipoise.

Preparation of polyaldimine

Example 16 Preparation of a Monomeric Polyaldimine

| Component | grams |
|---|---|
| diethylene triamine | 60 |
| benzaldehyde | 123 |
| toluene | 100 |

All reagents were charged into an evaporating flask in the following order: diethylene triamine, toluene and benzaldehyde. The flask was installed in rotary evaporator and heated at 60° C. for 40 minutes with rotation. Toluene and water were distilled off under a reduced pressure.

Example 17 Preparation of a Monomeric Polyaldimine

| Component | grams |
|---|---|
| A) ethylenediamine | 147 |
| B) benzaldehyde | 518 |

Into a reactor containing Component A was added Component B through an addition funnel over thirty minutes while cooling in a water bath. Water was distilled off under a reduced pressure.

Example 18 Preparation of an Oligomeric Polyaldimine

| Component | grams |
|---|---|
| A) the product of Example 16 | 321 |
| hexanediol diacrylate | 130 |
| B) EEP | 451 |

Component A was charged into a reaction flask equipped with a nitrogen inlet, thermometer, metal stirrer, and a cold water condenser. The reactor was heated to 90° C. under a nitrogen atmosphere. The reaction was continued for about 25 minutes until the exotherm disappeared, then Component B was added to the reactor. The resulting aldimine had an NV of 47.0 and a Brookfield viscosity of 14 cps.

Example 19 Preparation of an Oligomeric Polyaldimine

| Component | grams |
|---|---|
| A) the product of Example 16 | 302 |
| bisphenol epichlorohydrin based epoxy resin | 204 |
| B) EEP | 510 |

The procedure is the same as Example 18. The resulting resin had an NV of 47.5 and a Brookfield viscosity of 42 cps.

Example 20 Preparation of an Oligomeric Polyaldimine

| Component | grams |
|---|---|
| A) polyoxypropylenetriamine | 656 |
| B) benzaldehyde | 476 |

Into a reaction flask containing Component A, was added Component B through an addition funnel over 1.5 hours. When addition was complete, the reaction temperature was raised to 80° C. and the reaction was continued for another 2 hours. The product was transferred to a rotary evaporator and water was distilled off under a reduced pressure.

Example 21 Preparation of a Polyketimine

| Component | grams |
|---|---|
| polyoxypropylene triamine | 300 |
| methylisobutyl ketone | 248 |
| toluene | 100 |
| Zn acetate | 1.5 |

All ingredients were introduced into a reaction flask equipped with a nitrogen inlet, thermometer, metal stirrer, distillate receiver and a cold water condenser. Under a nitrogen stream, the reactor was heated to reflux and heating was continued for 5.5 hours while collecting toluene and water. Residual toluene and water were removed under vacuum, then the product was filtered to obtain a clear liquid.

Example 22 Preparation of a Secondary Amine

| Component | grams |
|---|---|
| A) cyclohexyl amine | 211 |
| B) trimethylol propane triacrylate | 210 |

Component A was charged into a reactor equipped with a nitrogen inlet, metal stirrer, thermometer, and a cold water condenser. The temperature was raised to 100° C. under a nitrogen stream, then Component B was added into the reactor through an addition funnel over 40 minutes. The reaction was continued at 100° C. for 1 hour.

Preparation of One-Pack Water Dispersible Resin

Example 23 Preparation of One-Pack Water Dispersible Acetoacetylated Polyurethane

| Component | grams |
|---|---|
| A) the product of Example 15 | 990 |
| B) the product of Example 17 | 20 |
| butoxyethanol | 20 |

Component A was charged into a 2-liter flask and then Component B was added with stirring over approximately ten minutes under a nitrogen stream. Stirring was continued at room temperature for one hour. The resulting chain-extended water dispersible resin had an NV of 45.0, a pH of 8.9, and a Brookfield viscosity of 170 centipoise.

Example 24 Preparation of One-Pack, Water Dispersible Acetoacetylated Blend of Polyurethane and Acrylic Polymer

| Component | grams |
| --- | --- |
| A) the product of Example 13 | 500 |
| the product of Example 14 | 500 |
| B) the product of Example 17 | 20 |
| butoxyethanol | 20 |
| C) fluoroalkyl polyoxyethylene polymer in 2-propanol (FPOE) | 0.5 |

Component A was charged into a 2-liter reaction flask equipped with a metal agitator and a nitrogen inlet. Component B was added with vigorous stirring over approximately ten minutes. Stirring was continued at room temperature for one hour. After Component C was then added and the aqueous dispersion was passed through a 25 micron filter bag. The resulting water dispersible resin had an NV of 40.6, a pH of 7.80, and a Brookfield viscosity of 26 centipoise.

Coating Evaluation of Organic Solvent System

Example 25 Comparative Evaluation Between Aromatic Aldimine and Aliphatic Ketimine Crosslinkers A pigmented coating composition was prepared by mixing acrylic polyacetoacetate of Example 2 and $TiO_2$ with a pigment to a binder ratio of 0.6:1.0 with subsequent grinding to 7+ (N.S.) The pigmented resin was mixed with the aromatic aldimine of Example 20 and the aliphatic ketimine of Example 14, respectively to obtain a weight ratio of binder to crosslinker of 4.4:1.0. Resins were applied on steel panels at 3.0 mil wet thickness and coatings were allowed to cure at room temperature for 7 days before testing. The gel time measures the time period that a mixture of two components free of $TiO_2$ becomes solid at room temperature.

|  | Aromatic Aldimine of Example 20 | Aliphatic ketimine of Example 21 |
| --- | --- | --- |
| Gel time (minutes) | 160 | 35 |
| Gloss (60°/20°) | 83/78 | 70/32 |
| b' value | −0.33 | −0.95 |
| Impact strength (lb inch) (direct/reverse) | 10/<10 | 40/<10 |
| MEK double scrub resistance | 100+ | 94 |
| Pencil hardness | HB-F | HB |
| Dry time (hours) | 1½ | ⅞ |
| Dry-through | | |
| Chemical resistance (24 hrs) | | |
| 10% HCl | 4 | 4 |
| 10% NaOH | 5 | 5 |
| (0-5 scale, 5: best) | | |
| QUV exposure (119 hrs) Gloss (60°/20°) | 84/68 | 71/35 |

This example clearly demonstrates that the aromatic aldimine outperforms the aliphatic ketimine as a room temperature curing crosslinker to acetoacetate resin, providing longer pot life, better gloss and better solvent resistance.

Example 26 A Pigmented Coating Composition was Prepared with the Acrylic Polyacetoacetate of Example 1 in Accordance with the Procedure in Example 25

The pigmented resin was mixed with the aromatic aldimine of Example 20 to obtain a weight ratio of binder to crosslinker of 2.3:1.0. A coating was applied and cured as described in Example 25.

| Gel time (minutes) | 735 |
| --- | --- |
| Dry time (hours) | 5.5 |
| Gardner dry through | |
| Gloss (60°/20°) | 85/68 |
| b' value | −0.13 |
| Impact strength (lb inch) | 80/10 |
| MEK double scrub resistance | 20 |
| Chemical resistance (24 hours) | |
| 10% HCl | 5 |
| 10% NaOH | 5 |
| (0-5 scale, 5: best) | |

This example serves to show that an acetoacetate group containing acrylic resin may be successfully cured with aromatic aldimine at room temperature to provide a base and acid resistant coating.

Example 27 A Pigmented Resin was Prepared as Example 25 with the Acrylic Polyacetoacetate of Example 3

The pigmented resin was mixed with the aromatic aldimine of Example 20 to obtain a weight ratio of binder to crosslinker of 11.9:1.0. A coating was applied and cured as in Example 25. This example demonstrates that an acetoacetate acrylic resin containing anhydride and epoxy functionality may be cured successfully with an aromatic aldimine crosslinker to provide a high gloss coating with excellent solvent and moisture resistance.

| Gel time (min.) | 140 |
| --- | --- |
| Dry time | |
| Set-to-touch (min.) | 15 |
| Dry through (hours) | 0.5 |
| Dry hard (hours) | 5 |
| Pencil hardness | HB-F |
| Gloss (60°/20°) | 93/85 |
| DOI | 70 |
| Impact (direct/reverse; lb inch) | 20/<10 |
| MEK double scrub resistance | 96 |
| b' value | 0.93 |
| QUV exposure (475 hours) | |
| Gloss (60°/20°) | 91/81 |
| b' value | 3.6 |
| Salt-spray (170 hours) | 10, 3/16 |
| Face blister/scribe creep (inch) | |
| Humidity exposure (170 hours) | 10, 92/84 |
| Face blister/Gloss | |

Example 28

A pigmented resin was prepared as in Example 25 with the epoxy polyacetoacetate of Example 6. The pigmented resin was mixed with the aromatic aldimine of Example 18 to obtain a weight ratio of binder to aldimine crosslinker of 1.5:1.0. A coating was cured at room temperature for 5 days before testing.

| Gel time (minutes) | 100 |
| --- | --- |
| Dry film thickness (mil) | 1.5 |
| Dry hard (hours) | 3.5 |

| | |
|---|---|
| Gloss (60°/20°) | 92/82 |
| MEK double scrub resistance | 100+ |
| X-batch adhesion (0–5 scale, 5: best) | 5 |
| Pencil hardness | F |

This example demonstrates that an acetoacetate epoxy resin may be cured with an aromatic aldimine at room temperature to provide a high performance coating with excellent gloss, solvent resistance and adhesion.

Example 29 A Pigmented Resin was Prepared as in Example 25 with the Urethane Polyacetoacetate of Example 7

The pigmented resin was mixed with the aromatic aldimine of Example 20 to obtain a weight ratio of binder to aldimine crosslinker of 9.7:1.0. A coating was cured at room temperature for 10 days before testing.

| | |
|---|---|
| Dry film thickness (mil) | 1.3 |
| Gel time (minutes) | 80 |
| Gloss (60°/20°) | 85/67 |
| DOI | 50 |
| Impact strength (lb inch) (direct/reverse) | 160/60 |
| Pencil hardness | 3H–4H |
| X-hatch adhesion (0–5 scale, 5: best) | 5 |
| MEK double scrub resistance | 78 |

This example shows that an acetoacetate urethane resin may be cured with an aromatic aldimine crosslinker at room temperature to provide a high performance coating with excellent impact strength, adhesion, hardness and solvent resistance.

Example 30 A Pigmented Resin was Prepared as in Example 25 with the Ester Polyacetoacetate of Example 8

The pigmented resin was mixed with the aromatic aldimine of Example 20 to obtain a weight ratio of binder to aldimine crosslinker of 7.3:1.0. A coating was cured at room temperature for 7 days. This example demonstrates that an acetoacetate ester resin may be cured with an aromatic aldimine crosslinker to provide a high performance coating with excellent gloss, hardness, impact strength, and solvent resistance.

Example 31 A Pigmented Resin was Prepared as in Example 25 with a Blend of Twelve Parts Ester Polyacetoacetate of Example 8 and One Part Acrylic Polyacetoacetate of Example 5

The pigmented resin was mixed with aromatic aldimine of Example 20 to obtain a weight ratio of binders to aldimine crosslinker of 7.9:1.0. A coating was cured at room temperature for 7 days before testing. This example demonstrates that a blend of acetoacetate acrylic resin and acetoacetate ester resin may be cured with an aromatic aldimine at room temperature to provide a high performance coating with excellent gloss, impact strength and solvent resistance.

| | Example 30 | Example 31 |
|---|---|---|
| Gel time (minutes) | 935 | 305 |
| Dry time thickness (mil) | 1.3 | 1.0 |
| Gloss (60°/20°) | 96/92 | 94/90 |
| b' value | 0.1 | −0.6 |
| Pencil hardness | 2B | 2B |
| Impact strength (lb inch) (direct/reverse) | 160/160 | 160/100 |
| MEK double scrub resistance | 200+ | 200+ |

Example 32

A pigmented resin was prepared as in Example 25 with alkyd polyacetoacetate of Example 9. The pigmented resin was mixed with aromatic aldimine of Example 20 to obtain a weight ratio of binder to aldimine crosslinker of 16.0:1.0. A coating was cured at room temperature for 7 days before testing.

| | |
|---|---|
| Dry film thickness (mil) | 2.1 |
| Gloss (60°/20°) | 94/88 |
| Pencil hardness | 3B |
| b' value | 6.0 |
| MEK double scrub resistance | 50 |
| Gel time (minutes) | 80 |

This example demonstrates that an acetoacetate alkyd resin may be cured with an aromatic aldimine to provide a coating with excellent gloss and good solvent resistance.

Example 33

A pigmented coating composition was prepared as in Example 25 with acrylic polyacetoacetate of Example 4. The pigmented resin was mixed with aromatic aldimine of Example 20 and secondary amine of Example 22 to obtain a weight ratio of binder to aldimine to secondary amine of 10:0.25:0.25. A coating was applied and cured as described in Example 25.

| | |
|---|---|
| Gel time (minutes) | >300 |
| Gloss (60°/20°) | 81/70 |
| DOI 100 | 2.1 |
| b' value | |
| Pencil hardness | 2B |
| MEK double scrub resistance | 80 |
| QUV exposure (659 hours) | |
| Gloss (60°/20°) | 75/42 |
| b' value | 1.6 |

This example demonstrates that a blend of aromatic aldimine and secondary amine may be used to cure an acetoacetate acrylic resin to provide a high performance coating with excellent potlife.

Example 34

A pigmented coating composition was prepared as in Example 25 with ester polyacetoacetate of Example 8. The pigmented resin was mixed with the oxirane modified ester (AROFLINT 607®) and aromatic aldimine of Example 20 to obtain a weight ratio of binder to aldimine to epoxy compound of 6.0:0.5:0.25. A coating was applied and cured as described in Example 25.

| | |
|---|---|
| DFT (mil) | 1.2 |
| Gloss (60°/20°) | 93/88 |
| b' value | −0.30 |
| Pencil hardness (gouge) | HB |
| MEK double scrub resistance | 48 |

| Impact strength (lb inch) | 160/160 |
|---|---|

This example demonstrates that an epoxy compound may be blended with an acetoacetate acrylic resin and an aromatic aldimine crosslinker to obtain a high performance coating.

Coatinc Evaluation of Water Dispersible System

Example 35 Water Dispersible Two-Pack System

Clear Coat Formulation

| Component | grams |
|---|---|
| A) Resin prepared in Example 10 | 100 |
|    butyl Cellosolve | 10 |
| B) Crosslinker prepared in Example 20 | 3.5 |

Component B was added into Component A with moderate agitation.

White Coat Formulation

| Component | grams |
|---|---|
| A) Resin prepared in Example 10 | 200 |
|    TiO$_2$ | 49.9 |
|    water | 40 |
| B) Crosslinker prepared in Example 20 | 6.23 |

Component A was prepared by adding TiO$_2$ and water and grinding to 7+ Hegman grind scale. Subsequently, Component B was mixed with moderate agitation.

Both clear and white coats were applied on Bonderite 1000 steel panels at 3.0 mil wet thickness and coatings were allowed to cure at room temperature for seven days before testing.

Example 36 Water Dispersible Two-Pack System

Clear Coat Formulation

| Component | grams |
|---|---|
| A) Resin prepared in Example 11 | 100 |
|    butyl Cellosolve | 10 |
| B) Crosslinker prepared in Example 20 | 3.2 |

White Coat Formulation

| Component | grams |
|---|---|
| A) Resin prepared in Example 11 | 149 |
|    water | 50 |
|    butyl Cellosolve | 20 |
|    TiO$_2$ | 47 |
| B) Crosslinker prepared in Example 20 | 4.8 |

Coatings were prepared, applied, and cured as described in Example 35.

Example 37 Water Dispersible Two-Pack System

Clear Coat Formulation

| Component | grams |
|---|---|
| A) Resin prepared in Example 12 | 100 |
|    butoxyethanol | 10 |
|    N-methylpyrrolidinone | 10 |
|    water | 10 |
| B) 4-glycidyloxy-N,N-diglycidyl aniline epoxy | 10 |
| C) Crosslinker prepared in Example 20 | 1.73 |

Component B was added into Component A, then after agitation for 2-3 minutes, Component C was added and mixed. A coating was applied and cured as described in Example 35.

Example 38 Water Dispersible One-Pack System

Clear Coat Formulation

Resin prepared in Example 23 was used without further formulation.

White Coat Formulation

|  | grams |
|---|---|
| Resin prepared in Example 23 | 200 |
| TiO$_2$ | 72 |

TiO$_2$ was added to the resin and the mixture was ground to 7+ Hegman grind scale. Coatings were applied and cured as described in Example 35.

Example 39 Water Dispersible One-Pack System

Clear Coat Formulation

|  | grams |
|---|---|
| Resin prepared in Example 24 | 100 |
| 2-amino-2 methyl-l-propanol (AMP) | 1.0 |
| water | 75 |

Flash rust inhibitor, AMP, and water were added to the resin with moderate agitation. A coating was applied and cured as described in Example 35.

The coating results for the water dispersible systems were collected in Table 1. These examples clearly prove that the novel acetoacetate-aromatic aldimine chemistry can be utilized to develop high-performance waterborne coating compositions.

TABLE 1

Coating Evaluation of Water-Dispersed Acetoacetylated Resins

| | Example 35 | | Example 36 | | | Example 38 | | |
| | Clear | Pigmented | Clear | Pigmented | Example 37 | Clear | Pigmented | Example 39 |
|---|---|---|---|---|---|---|---|---|
| Gloss (60°/20°) | 75/39 | 70/15 | 96/84 | 87/49 | 90/63 | 97/68 | 24/3 | 102/90 |
| Impact Strength (Direct/Reverse) (lbs-inch) | 80/20 | 60/20 | 20/<10 | 40/10 | 160/120 | 160/160 | 160/160 | 20/20 |
| Pencil Hardness | H | H | F | H | H | 2H | H | H |
| Conical Mandrel | Pass | Pass | Pass | Pass | Pass | Pass | Pass | Pass |

TABLE 1-continued

Coating Evaluation of Water-Dispersed Acetoacetylated Resins

| | Example 35 | | Example 36 | | Example 37 | Example 38 | | Example 39 |
|---|---|---|---|---|---|---|---|---|
| | Clear | Pigmented | Clear | Pigmented | | Clear | Pigmented | |
| MEK Double Scrub Resistance | 100 | 100 | 36 | 30 | 100 | 100 | 100 | 39 |
| Chemical Resistance (2 hrs) | | | | | | | | |
| 10% NaOH | SD | SD | SD | SD | OK | OK | OK | OK |
| 10% $H_2SO_4$ | OK | Bl 7F | OK | SD | SD | OK | OK | OK |
| 10% $CH_3COOH$ | OK | Whitens | OK | VH | SD | Slt.H | VH | OK |
| 4% $NH_4OH$ | OK | OK | OK | OK | OK | OK | OK | OK |
| Gasoline | OK | OK | OK | Slt.S | OK | SS | OK | SS |
| Stain Resistance (2 hrs) | | | | | | | | |
| Ketchup | OK | OK | OK | OK | OK | OK | OK | OK |
| Mustard | OK | V.Slt | M | D | Slt | M | M | M |
| Lipstick | OK | OK | OK | Slt | OK | OK | Slt | OK |
| Merthiolate | OK | M | Slt | D | Slt | Slt | M | D |
| Iodine | D | D | D | D | M | D | D | D |
| Shoe Polish (Br/Blk) | OK/OK | OK/OK | M/OK | M/M | OK/OK | D/M | M/M | D/M |
| Marker | Slt | M | D | D | Slt | Slt | D | Slt |
| Pen | OK | OK | Slt | D | M | V.Slt | D | OK |
| Coffee | OK | OK | OK | Wrk | OK | OK | Slt | OK |
| Cola | OK | OK | OK | OK | OK | OK | OK | OK |
| Solvent Resistance | | | | | | | | |
| Ethanol/water (1:1) | OK | OK | OK | OK | OK | OK | OK | OK |
| Ethanol | OK | OK | OK | OK | OK | OK | Slt.H | OK |
| Methanol | OK | OK | OK | OK | OK | OK | Slt.H | OK |
| Toluene | OK | OK | OK | OK | OK | OK | OK | SD |
| Acetone | OK | OK | OK | OK | OK | OK | OK | OK |
| MEK | OK | OK | OK | OK | OK | OK | OK | OK |
| Xylene | OK | OK | OK | OK | OK | OK | OK | Wrk |
| 1,1,1-trichloroethene | OK | OK | OK | OK | OK | Slt.H | OK | OK |
| Taber Abrasion (milligram loss/500 cycles/CS-10) | 20.0 | NA | NA | NA | 28.1 | 15.7 | NA | 39 |

SD = severely damaged
Slt.H = slightly haze
Slt.S = slightly soft
VH = very hazy
SS = slightly soft
M = medium
D = dense
Slt = slight
Wrk = wrinkled
V.Slt = very slight

What is claimed is:

1. A curable composition comprising a first component including a compound comprising at least two acetoacetate groups, and a second component including a compound comprising at least two groups which will react with an acetoacetate group, at least one of which is an aromatic aldimine group having a relatively low reactivity with water when compared with its reactivity with an acetoacetate group.

2. The composition of claim 1 wherein the composition is curable at ambient temperature.

3. The composition of claim 2 wherein the two groups which will react with an acetoacetate group are both aromatic aldimine groups.

4. The composition of claim 1 wherein the components are combined in water to form an aqueous dispersion.

5. The composition of claim 1 wherein the composition is provided as a packaged system of separately contained first and second components to be mixed to form a blended composition.

6. The composition of claim 2 wherein the aldimine is the reaction product of an amine with an R substituted benzaldehyde where R is radical selected from the group consisting of hydrogen, lower alkyl of one to six carbon atoms, halolower alkyl of one to six carbon atoms or halogen.

7. The composition of claim 2 wherein the composition contains from 0.1 to 5 weight percent water.

8. The composition of claim 6 wherein the composition contains from 0.1 to 5 weight percent water.

9. The composition of claim 2 wherein the acetoacetate compound comprises an acrylic based polyacetoacetate comprising 5-100% by weight of an acetoacetate ester of a hydroxyalkylacrylate compound or of alkyl alcohol, 0-30% by weight of ethylenically unsaturated anhydride, 0-70% by weight of a glycidyl ester of a mono-ethyenically unsaturated carboxylic acid and 0-80% by weight of olefinically unsaturated monomers.

10. The composition of claim 9 wherein the hydroxyacrylate compound is a hydroxyalkylmethacrylate and the olefinically unsaturated monomer is a monovinylhydrocarbon.

11. The composition of claim 9 wherein the hydroxyacrylate compound is a hydroxyalkylacrylate and the olefinically unsaturated monomer is a monovinylhydrocarbon.

12. The composition of claim 2 wherein the acetoacetate compound is an acetoacetylated product of a hydroxy containing polymer formed by the reaction of polyisocyanate with polyhydroxy compound.

13. The composition of claim 2 wherein the acetoacetate compound is an acetoacetylated product of a hydroxy containing polymer formed by the reaction of a polyepoxide with a polyhydroxy compound, a polycarboxy compound or mixtures thereof.

14. The composition of claim 2 wherein the acetoacetate compound is an acetoacetylated product of a hydroxy containing polymer formed by the reaction of a polyhydroxy compound with a carboxy compound or an acid anhydride compound.

15. The composition of claim 14 wherein the carboxy compound is a fatty acid.

16. The composition of claim 10 wherein the carboxy compound is a polycarboxy compound.

17. The composition of claim 1 wherein the aldimine compound has the formula $R_1(R_2)_n$ where $R_1$ is a polyvalent carbon terminated radical containing aldimine non-reactive groups;

$R_2$ is aldimine or amino; and n is greater than 1.

18. The composition of claim 1 wherein the composition includes a secondary amine compound blended with the aromatic aldimine.

19. A product comprising a cured film of a blended two component composition of claim 1.

20. A product comprising a cured film of a blended two component composition of claim 5.

21. A product comprising a cured film of a blended two component composition of claim 6.

22. A product comprising a cured film of a blended two component composition of claim 7.

23. A product comprising a cured film of a blended two component composition of claim 8.

24. A product comprising a cured film of a blended two component composition of claim 9.

25. A product comprising a cured film of a blended two component composition of claim 10.

26. A product comprising a cured film of a blended two component composition of claim 11.

27. A product comprising a cured film of a blended two component composition of claim 12.

28. A product comprising a cured film of a blended two component composition of claim 13.

29. A product comprising a cured film of a blended two component composition of claim 14.

30. A product comprising a cured film of a blended two component composition of claim 15.

31. A product comprising a cured film of a blended two component composition of claim 16.

32. A product comprising a cured film of a blended two component composition of claim 17.

33. A product comprising a cured film of a blended two component composition of claim 18.

34. A product comprising a cured film of a blended two component composition of claim 19.

35. A product comprising a cured film of a blended two component composition of claim 20.

* * * * *